(12) United States Patent
Schmalz et al.

(10) Patent No.: US 10,658,834 B2
(45) Date of Patent: *May 19, 2020

(54) RECEPTACLE, CIRCUIT PROTECTION SYSTEM, AND CIRCUIT INTERRUPTER WITH OVER-TEMPERATURE DETECTION

(71) Applicant: EATON CORPORATION, Cleveland, OH (US)

(72) Inventors: Steven Christopher Schmalz, Franklin, WI (US); Xin Zhou, Wexford, OH (US); Nilesh Ankush Kadam, Pune (IN); Abhijeet Nitin Rathi, Buldhana (IN)

(73) Assignee: EATON INTELLIGENT POWER LIMTED, Dublin (IE)

( * ) Notice: Subject to any disclaimer, the term of this patent is extended or adjusted under 35 U.S.C. 154(b) by 309 days.

This patent is subject to a terminal disclaimer.

(21) Appl. No.: 15/716,922

(22) Filed: Sep. 27, 2017

(65) Prior Publication Data

US 2019/0097416 A1    Mar. 28, 2019

(51) Int. Cl.
| | | |
|---|---|---|
| H02H 5/00 | (2006.01) | |
| H02H 5/04 | (2006.01) | |
| G01K 7/24 | (2006.01) | |
| G01K 3/00 | (2006.01) | |

(52) U.S. Cl.
CPC ............ *H02H 5/042* (2013.01); *G01K 3/005* (2013.01); *G01K 7/24* (2013.01)

(58) Field of Classification Search
None
See application file for complete search history.

(56) References Cited

U.S. PATENT DOCUMENTS

| | | | |
|---|---|---|---|
| 4,571,659 A | 2/1986 | Demeyer et al. | |
| 4,695,961 A | 9/1987 | Arinobu | |
| 5,115,371 A | 5/1992 | Tripodi | |
| 5,521,838 A * | 5/1996 | Rosendahl | H02J 3/14 307/35 |
| 5,757,162 A * | 5/1998 | Weber | H02P 25/04 318/531 |
| 9,520,254 B2 | 12/2016 | Zheng et al. | |
| 9,520,710 B2 | 12/2016 | Zhou et al. | |
| 9,728,348 B2 | 8/2017 | Zhou et al. | |
| 2016/0276115 A1 | 9/2016 | Zheng et al. | |

* cited by examiner

*Primary Examiner* — Stephen W Jackson
(74) *Attorney, Agent, or Firm* — Eckert Seamans Cherin & Mellott, LLC

(57) ABSTRACT

A receptacle includes an outlet, an interruption mechanism structured to activate to de-energize the outlet, a temperature sensing circuit including a resistor and a thermistor arranged as a voltage divider, wherein the thermistor has a resistance proportional to temperature, a comparator circuit structured to compare an output of the temperature sensing circuit to a predetermined reference voltage and to selectively output a signal based on the comparison of the output of the temperature sensing circuit and the predetermined reference voltage. The interruption mechanism is structured to activate to de-energize the outlet in response to the comparator circuit outputting the signal.

17 Claims, 6 Drawing Sheets

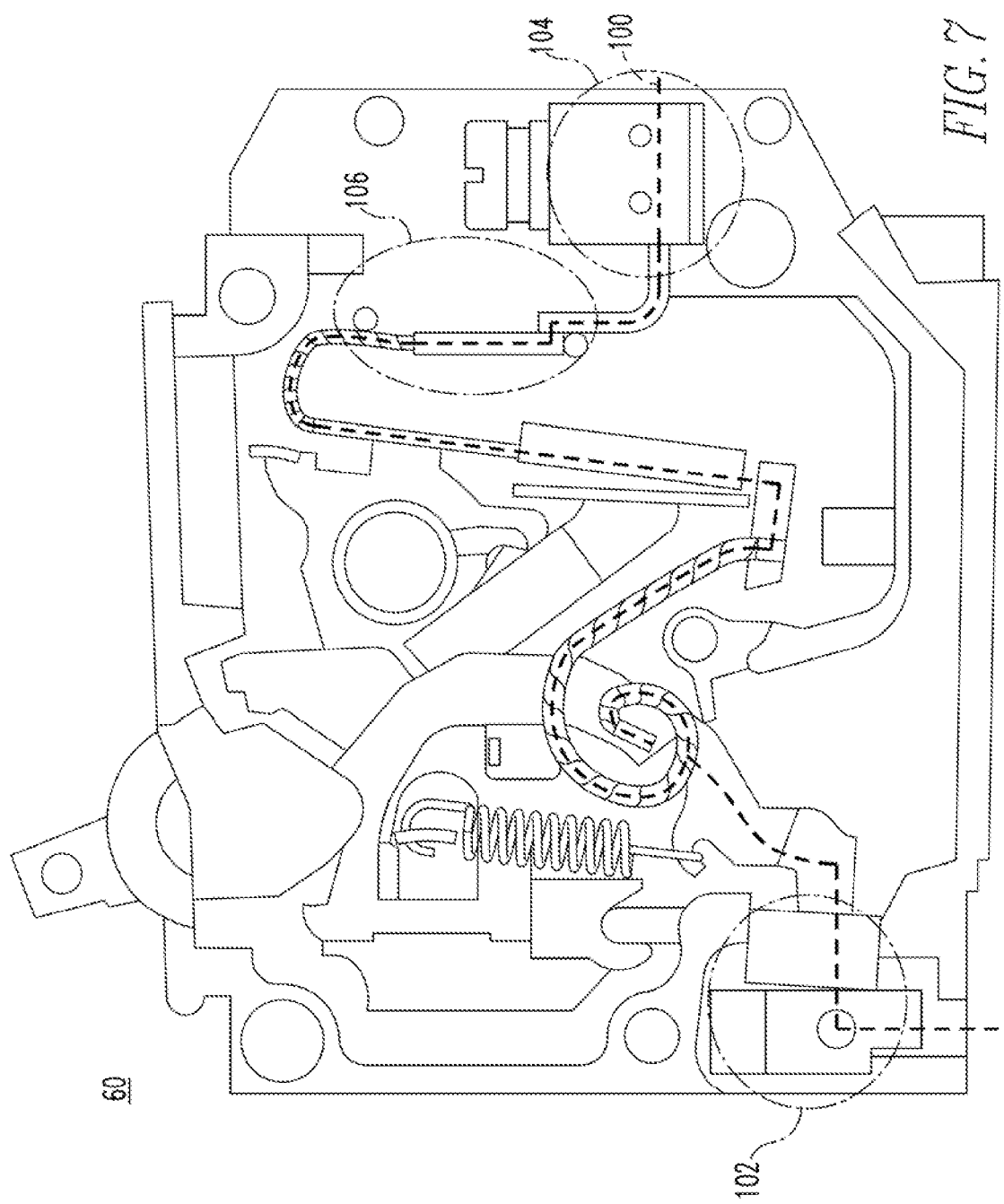

RECEPTACLE, CIRCUIT PROTECTION SYSTEM, AND CIRCUIT INTERRUPTER WITH OVER-TEMPERATURE DETECTION

BACKGROUND

Field

The disclosed concept relates generally to receptacles, and in particular, to receptacles with over-temperature detection. The disclosed concept also relates to circuit protection systems and circuit interrupters.

Background Information

Overheating in receptacle outlets is generally due to a poor electrical connection at the receptacle. The poor electrical connection can be at the plug stabs of the receptacle, wiring terminals of the receptacle, or elsewhere within the receptacle. The poor electrical connection can be due to numerous different reasons. For example, oxidized or contaminated contact surfaces at the points of connection can cause a poor electrical connection. As another example, low contact pressure due to weakened or bent prongs or clips or loose terminal screws or springs can also cause a poor electrical connection.

Overheating due to a poor electrical connection or other cause can cause a safety hazard at the receptacle. The overheating can cause the receptacle housing, wiring insulation, the junction box the receptacle is disposed within, the plug inserted into the receptacle, or other components in the vicinity of the receptacle and the receptacle itself to melt, deform, or catch fire. Overheating receptacles can put the dwelling in which the receptacles are installed at risk.

Receptacles are common devices in commercial and residential construction. It is common to install numerous receptacles in a building. It is thus desirable to keep the cost of receptacles minimal.

There is room for improvement in receptacles. There is also room for improvement in circuit protection systems and circuit interrupters.

SUMMARY

These needs and others are met by embodiments of the disclosed concept in which a circuit interrupter provides temperature based tripping.

In accordance with one aspect of the disclosed concept, a receptacle comprises: an outlet; an interruption mechanism structured to activate to de-energize the outlet; a temperature sensing circuit including a resistor and a thermistor arranged as a voltage divider, wherein the thermistor has a resistance proportional to temperature; a comparator circuit structured to compare an output of the temperature sensing circuit to a predetermined reference voltage and to selectively output a signal based on the comparison of the output of the temperature sensing circuit and the predetermined reference voltage, wherein the interruption mechanism is structured to activate to de-energize the outlet in response to the comparator circuit outputting the signal.

In accordance with another aspect of the disclosed concept, a circuit protection system comprises: a receptacle including: an outlet; a temperature sensing circuit including a resistor and a thermistor arranged as a voltage divider, wherein the thermistor has a resistance proportional to temperature; a comparator circuit structured to compare an output of the temperature sensing circuit to a predetermined reference voltage and to selectively output a signal based on the comparison of the output of the temperature sensing circuit and the predetermined reference voltage; and a processor electrically connected to the comparator circuit and being structured to sense the comparator circuit outputting the signal and to output a trip signal in response in response to sensing the comparator circuit outputting the signal; and a circuit breaker electrically connected between the receptacle and a power source, the circuit breaker including: separable contacts structured to trip open to prevent power from flowing from the power source to the receptacle; and a trip mechanism structured to receive the trip signal and to cause the separable contacts to trip open in response to the receiving the trip signal.

In accordance with another aspect of the disclosed concept, a circuit interrupter structured to be electrically connected between a power source and a load comprises: an interruption mechanism structured to activate to prevent power from flowing from the power source to the load; a temperature sensing circuit including a resistor and a thermistor arranged as a voltage divider, wherein the thermistor has a resistance proportional to temperature; a comparator circuit structured to compare an output of the temperature sensing circuit to a predetermined reference voltage and to selectively output a signal based on the comparison of the output of the temperature sensing circuit and the predetermined reference voltage, wherein the interruption mechanism is structured to activate to prevent power from flowing from the power source to the load in response to the comparator circuit outputting the signal.

BRIEF DESCRIPTION OF THE DRAWINGS

A full understanding of the disclosed concept can be gained from the following description of the preferred embodiments when read in conjunction with the accompanying drawings in which:

FIG. 7 is a front view of a circuit interrupter in accordance with a n example embodiment of the disclosed concept.

DESCRIPTION OF THE PREFERRED EMBODIMENTS

Figure 1:
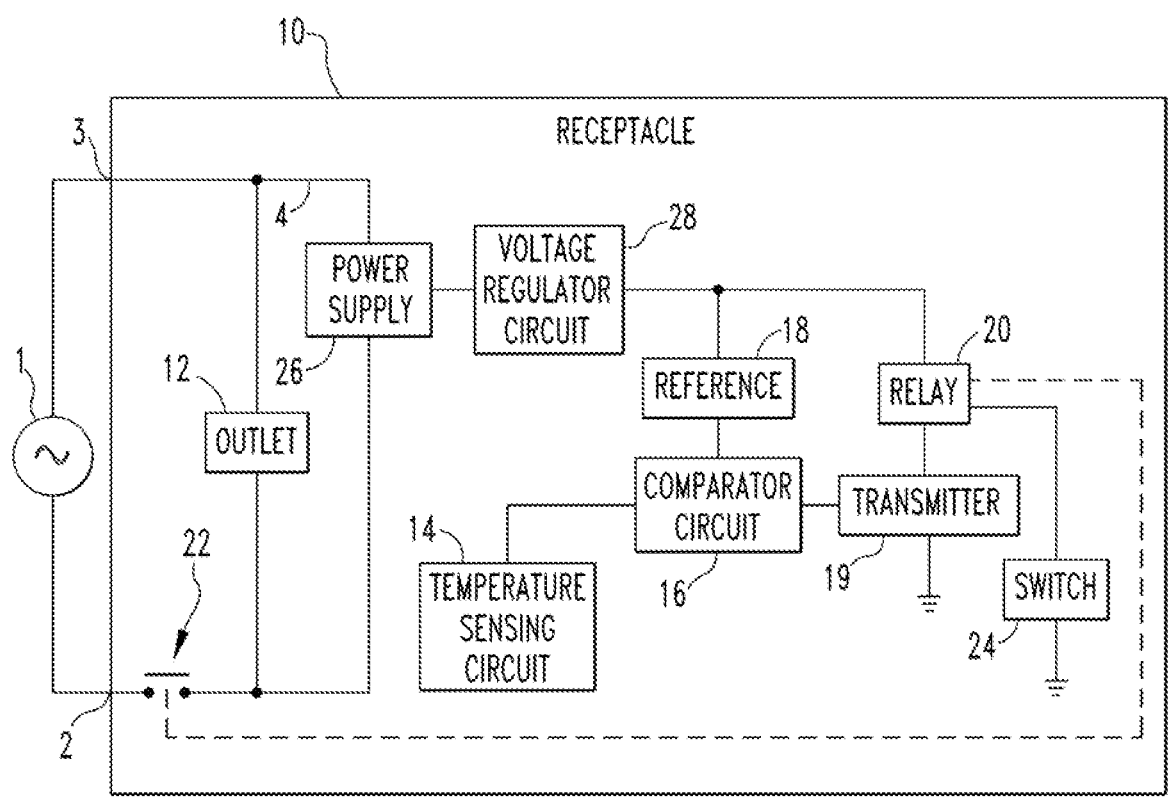
FIG. 1 is a schematic diagram of a receptacle in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

FIG. 1 is a schematic diagram of a receptacle 10 in accordance with an example embodiment of the disclosed concept. The receptacle 10 is electrically connected to a power source 1. The receptacle 10 receives power from the power source 1 via line and neutral inputs 2,3. The power source 1 may be, for example and without limitation, utility power. The line and neutral inputs 2,3 may be terminals (e.g., without limitation, terminal screws) structured to be electrically connected to the power source 1 via conductors such as, without limitation, wires.

The receptacle 10 may include one or more outlets 12. The outlets 12 are electrically connected to the line and neutral inputs 2,3 by one or more conductors (e.g., without limitation, line and neutral busses). The outlets 12 may be structured to receive a plug. A load (not shown) may be electrically connected to the receptacle 10 and powered by power from the receptacle 10 via the plug.

The receptacle 10 further includes a temperature sensing circuit 14. The temperature sensing circuit 14 includes a thermistor R6 and a resistor R5 arranged as a voltage divider (shown in FIG. 2). The thermistor R6 has a resistance that is proportional to its temperature. In some example embodiments of the disclosed concept, the thermistor R6 is a negative temperature coefficient (NTC) thermistor that has a resistance that is inversely proportional to temperature (e.g, the resistance of the thermistor decreases as temperature increases). In some example embodiments of the disclosed concept, the thermistor R6 is a positive temperature coefficient (PTC) thermistor that has a resistance that is directly proportional to temperature (e.g., the resistance of the thermistor increases as temperature increases).

The thermistor R6 is disposed proximate and thermally coupled to a current carrying conductor in the receptacle 10. In some example embodiments, the thermistor R6 may be disposed proximate the line and/or neutral inputs 2,3 of the receptacle 10. However, it will be appreciated by those having ordinary skill in the art that the thermistor R6 may be placed in different locations within the thermistor without departing from the scope of the disclosed concept.

The receptacle 10 further includes a comparator circuit 16. The comparator circuit 16 is electrically connected to an output of the temperature sensing circuit 14 and receives an output of the temperature sensing circuit 14. The output of the temperature sensing circuit 14 is a voltage that is proportional to the temperature of the thermistor R6. The comparator circuit 16 is also electrically connected to a reference voltage generating circuit 18 and receives a predetermined reference voltage from the reference voltage generating circuit 18. The comparator circuit 16 is structured to compare the output of the temperature sensing circuit 14 with the predetermined reference voltage and to selectively output a signal based on the comparison of the temperature sensing circuit 14 and the predetermined reference voltage.

In some example embodiments of the disclosed concept (e.g., when the thermistor R6 is an NTC thermistor), the comparator circuit 16 is structured to output the signal when the output of the temperature sensing circuit 14 is less than the predetermined reference voltage and is structured to not output the signal when the output of the temperature sensing circuit 14 is greater than the predetermined reference voltage. In some example embodiments of the disclosed concept (e.g., when the thermistor R6 is a PTC thermistor), the comparator circuit 16 is structured to output the signal when the output of the temperature sensing circuit 14 is greater than the predetermined reference voltage and is structured to not output the signal when the output of the temperature sensing circuit 14 is less than the predetermined reference voltage.

The receptacle 10 further includes a transistor 19 and an interruption mechanism 20,22. In some example embodiments of the disclosed concept, the interruption mechanism 20,22 includes a relay 20 and associated separable contacts 22. The interruption mechanism 20,22 is structured to activate to de-energize the outlet 12. For example, the interruption mechanism 20,22 may be structured to open separable contacts 22 between the line input 2 and the outlet 12 to stop current from flowing from the power source 1 to the outlet 12. The interruption mechanism 20,22 is structured to de-energize the outlet 12 in response to the comparator circuit 16 outputting the signal.

In some example embodiments of the disclosed concept, the comparator circuit 16 is electrically connected to the transistor 19 and outputting the signal from the comparator circuit 16 turns on the transistor 19. The interruption mechanism 20,22 includes the relay 20 that the transistor 19 is electrically connected to and turning on the transistor 18 allows current to flow through the relay 20 causing it to activate and open its associated separable contacts 22. Thus, in response to outputting the signal from the comparator circuit 16, the interruption mechanism 20,22 de-energizes the outlet 12. In some example embodiments of the disclosed concept, the relay 20 is a latching relay and its separable contacts 22 are normally in the closed position. Activating the latching relay by passing current through it causes the separable contacts 22 to move into the open position and latch in the open position so that they remain open. From the open position, the separable contacts 22 may be manually returned to the closed position to reset the latching relay.

In some example embodiments of the disclosed concept, the receptacle 10 may also include a switch 24 (e.g., a push-button switch). The switch 24 is electrically connected to the relay 20 and actuating the switch 24 activates the interruption mechanism 20,22 and causes the interruption mechanism 20,22 to de-energize the outlet 12. The switch 24 may be provided as a secondary method of de-energizing the outlet 12. It will be appreciated by those having ordinary skill in the art that the switch 24 may be omitted without departing from the scope of the disclosed concept.

The receptacle 10 may also include a power supply 26 and a voltage regulator circuit 28. The power supply 26 is structured to covert power from the power source 1 from AC power to DC power. In some example embodiments of the disclosed concept, the power supply 26 may include a bridge rectifier DB1 (shown in FIG. 2) to convert AC power to DC power. The voltage regulator circuit 28 is electrically connected to the power supply 26 and is structured to regulate the DC power output by the power supply 26 to a regulated DC voltage as a supply voltage usable by components of the receptacle 10 such as the reference voltage generating circuit 18, the temperature sensing circuit 14, the comparator circuit 16, and the interruption mechanism 20,22.

Figure 2:
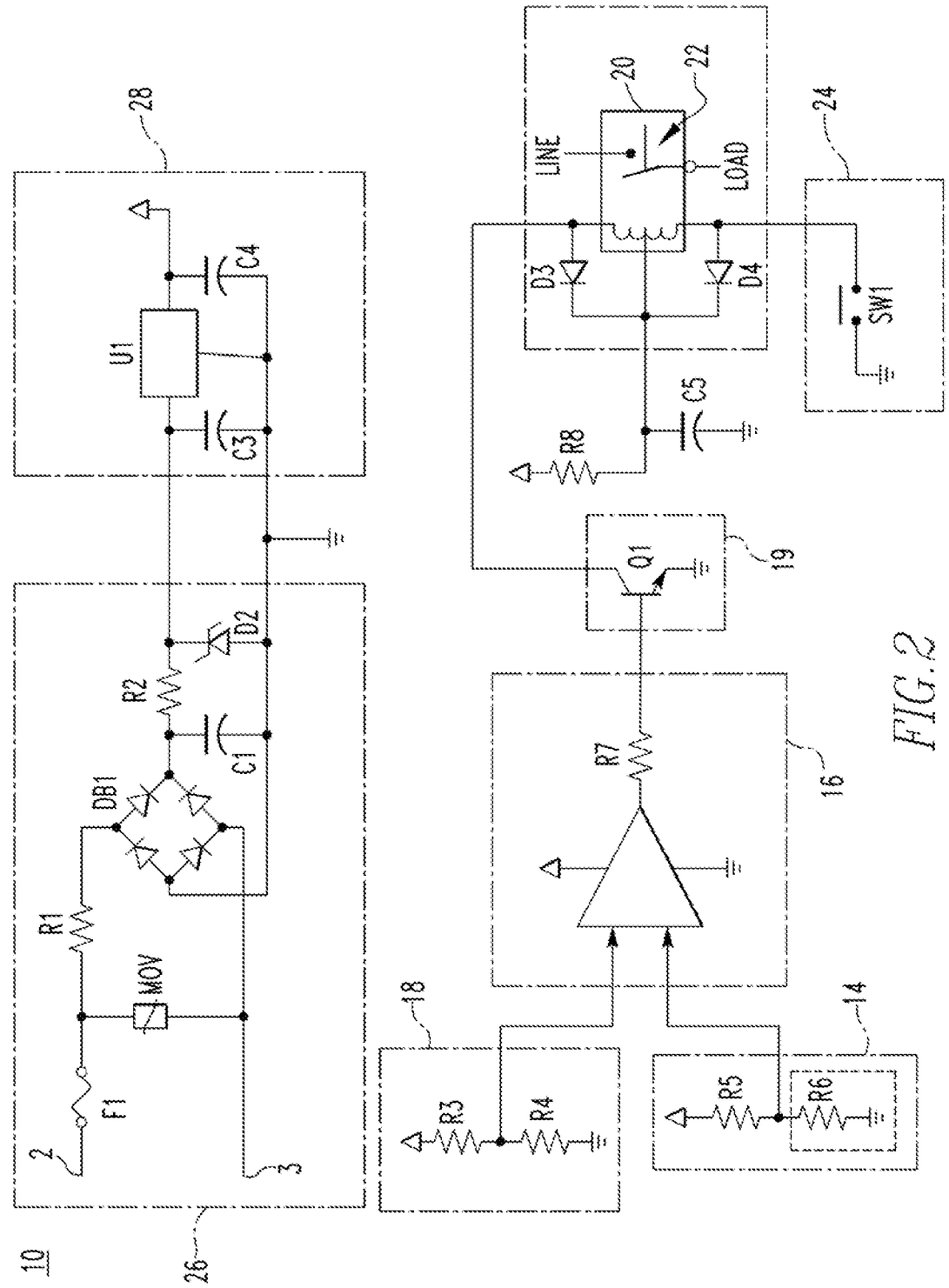
FIG. 2 is a circuit diagram of a receptacle in accordance with an example embodiment of the disclosed concept.

FIG. 2 is a circuit diagram of the receptacle 10 in accordance with an example embodiment of the disclosed concept. The circuit diagram of FIG. 2 illustrates an arrangement of circuit components that may be employed in the receptacle 10. However, it will be appreciated by those having ordinary skill in the art that different components and different arrangements of components may be employed in the receptacle 10 without departing from the scope of the disclosed concept.

The reference voltage generating circuit 18 includes a first resistor R3 and a second resistor R4 arranged as a voltage divider between the supply voltage and ground. The temperature sensing circuit 14 includes a resistor R5 and an NTC thermistor R6 arranged as a voltage divider between the supply voltage and ground. It will be appreciated by those having ordinary skill in the art that the NTC thermistor R6 may be replaced with a PTC thermistor without departing from the scope of the disclosed concept. Outputs of the reference voltage generating circuit 18 and the temperature sensing circuit 14 are electrically connected to the comparator circuit 16.

The comparator circuit 16 includes an operational amplifier U2 structured to receive the outputs of the reference voltage generating circuit 18 and the temperature sensing circuit 14 at its inputs. An output of the operational amplifier U2 is electrically connected to a resistor R7. The transistor 19 is a bipolar junction transistor including a base, a collector and an emitter. The output of the comparator circuit 16 is provided through the resistor R7 to the base of the transistor 19. The emitter of the transistor 19 is electrically connected to ground and the collector of the transistor 19 is electrically connected to the relay 20.

In some example embodiments of the disclosed concept, the relay 20 is a dual-coil relay. One coil of the relay 20 may be activated by turning on the transistor 19 and the other coil of the relay may be activated by actuating the switch 24. In some example embodiments of the disclosed concept, activating one of the coils of the relay 20 (e.g., an opening coil) via the transistor 19 will cause the relay 20 to activate and open the separable contacts 22. Activating the other one of the coils of the relay 20 (e.g., a reclose coil) via the switch 24 will cause the relay 20 to re-close the separable contacts 22. In some example embodiments employing a single coil relay, the turning on the transistor 19 activates the relay 20 and the switch 24 may be omitted from such embodiments.

The power supply 26 is electrically connected to the line and neutral inputs 2,3. The power supply 26 includes a fuse F1 electrically connected to the line input 2. The power supply 26 also includes a metal oxide varistor (MOV). The MOV provides protection from power quality events such as transients or surges. The power supply 26 further includes a bridge rectifier DB1 structured to rectify power received from the power source 1. A capacitor C1, resistor R2, and a Zener diode D2 may be coupled to an output of the bridge rectifier DB1 to condition the output of the bridge rectifier to provide a more stable output.

The voltage regulator circuit 28 includes first and second capacitors C3,C4. The voltage regulator circuit 28 further includes a linear voltage regulator U1. Linear voltage regulator U1 takes the voltage output of the power supply 26 and makes it into a very stable and precise voltage (e.g., without limitation, 12V) for use by other components of the receptacle 10. In some example embodiments of the disclosed concept, Zener diode D2 may clamp an output voltage of the power supply 26 to a predetermined voltage (e.g., without limitation, 24V) for input to linear voltage regulator U1.

Figure 3:
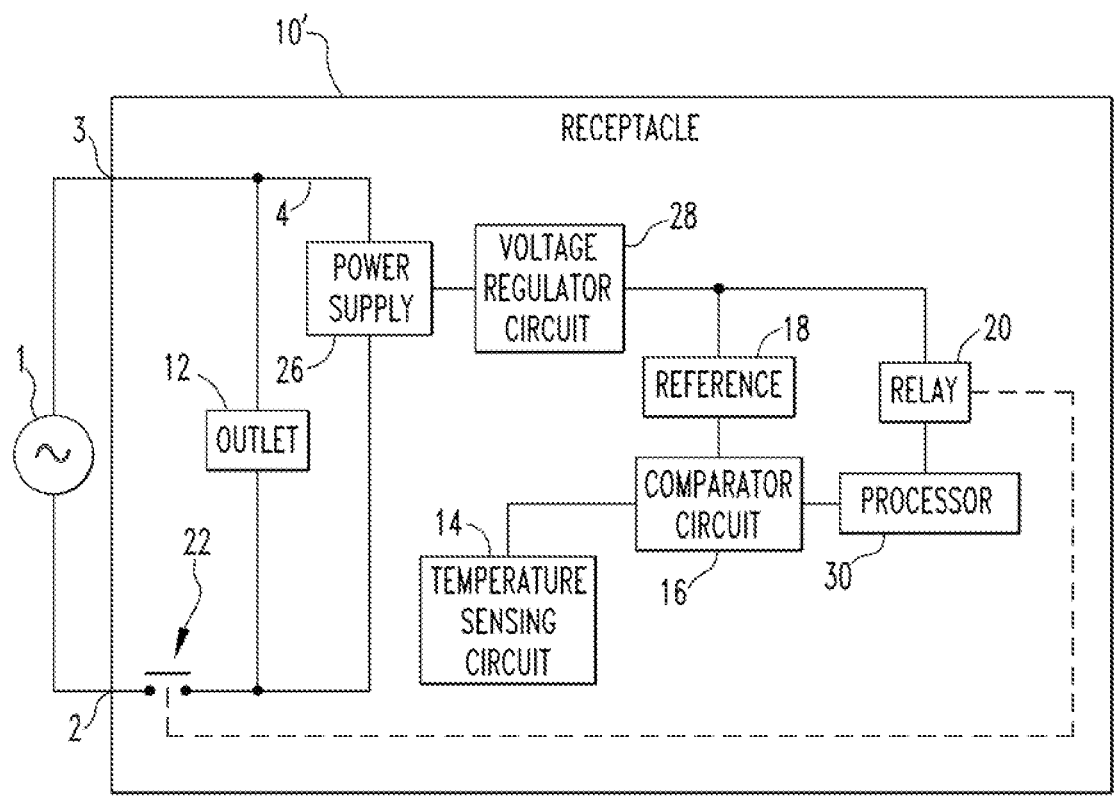
FIG. 3 is a schematic diagram of a receptacle in accordance with another example embodiment of the disclosed concept.

FIG. 3 is a schematic diagram of a receptacle 10' in accordance with another example embodiment of the disclosed concept. The receptacle 10' of FIG. 3 includes a power supply 26, voltage regulator circuit 28, temperature sensing circuit 14, reference voltage generating circuit 18, and comparator circuit 16 similar to those previously described with respect to FIG. 1. For economy of disclosure, repeated description of these components is omitted.

The receptacle 10' of FIG. 3 includes a processor 30 electrically connected to an output of the comparator circuit 16. The processor 30 is structured sense when the signal is output from the comparator circuit 16. In response to sensing the signal, the processor 30 is structured to control an interruption mechanism 20,22 to de-energize the outlet. The interruption mechanism 20,22 may be similar to the interruption mechanism 20,22 described in FIG. 1. However, it will be appreciated by those having ordinary skill in the art that other suitable types of interruption mechanisms may be employed without departing from the scope of the disclosed concept.

Figure 4:
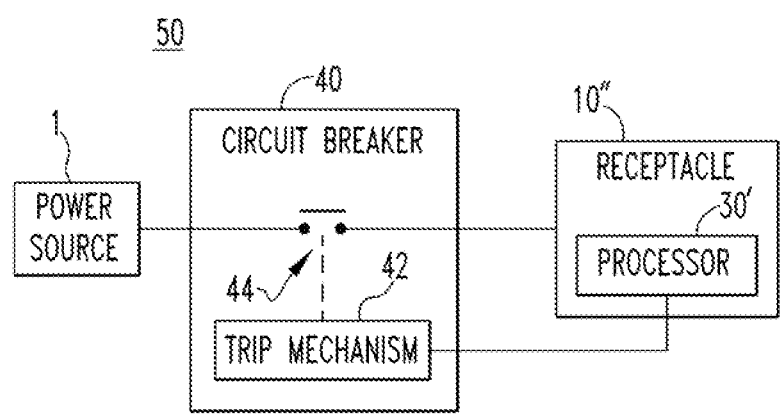
FIG. 4 is a schematic diagram of a circuit protection system in accordance with an example embodiment of the disclosed concept.

FIG. 4 is a schematic diagram of a circuit protection system 50 in accordance with an example embodiment of the disclosed concept. The circuit protection system 50 includes a receptacle 10" and a circuit breaker 40. The circuit breaker 40 is electrically connected between the power source 1 and the receptacle 10".

The receptacle 10" may be similar to the receptacle 10' shown in FIG. 3. For economy of disclosure, description of previously described elements is omitted. However, in the receptacle 10" shown in FIG. 4, the interruption mechanism 20,22 is omitted from the receptacle 10". Additionally, the processor 30' is structured to output a signal to the circuit breaker 40 in response to receiving the signal from the comparator circuit 16.

The circuit breaker 40 includes separable contacts 44 and a trip mechanism 42 structured to trip open the separable contacts 44. In response to receiving the signal from the processor 30' of the receptacle 10", the circuit breaker 40 is structured to cause the trip mechanism 42 to trip open the separable contacts 44. Tripping open the separable contacts 44 interrupts power flowing between the power source 1 and the receptacle 10". In some example embodiments of the disclosed concept, the receptacle 10" may be disposed on a branch circuit protected by the circuit breaker 40. Other components, such as other receptacles or devices may also be disposed on the branch circuit.

Figure 5B:
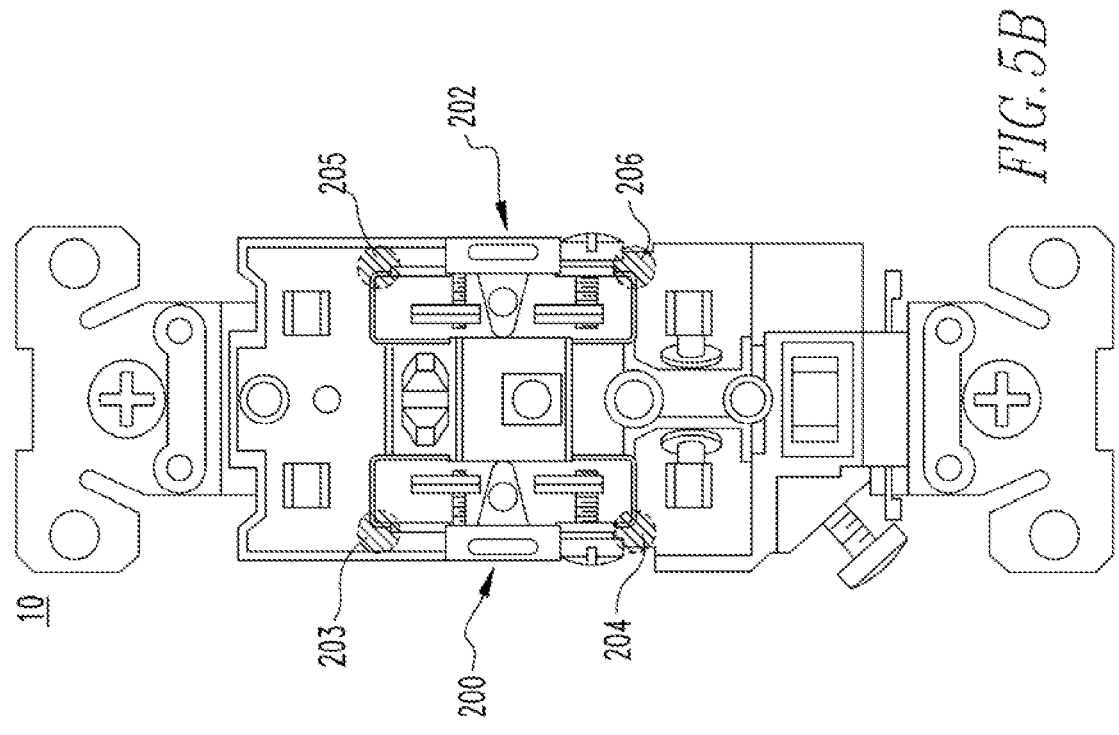
FIGS. 5A and 5B are front and rear view of a receptacle in accordance with an example embodiment of the disclosed concept.
Figure 5A:
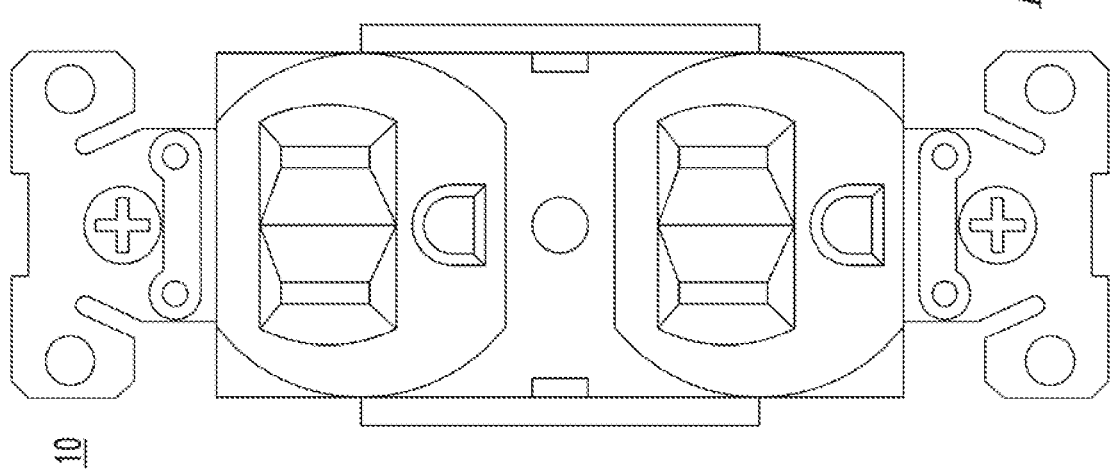

FIG. 5A is a front view of a receptacle 10 in accordance with an example embodiment of the disclosed concept and FIG. 5B is a rear view of the receptacle 10 of FIG. 5A. It will be appreciated by those having ordinary skill in the art that the receptacle of FIG. 1 may be embodied as the receptacle 10 shown in FIGS. 5A and 5B in some example embodiments of the disclosed concept. FIG. 5B illustrates a neutral bus 200 and a line bus 202 of the receptacle 10. The neutral bus 200 and the line bus 202 are connected to the power source 1 and power is provided to the outlet 12 of the receptacle 10 via the neutral and line busses 200,202.

The comparator circuit 16, the reference voltage generating circuit 18, the transistor 19, the relay 20, the switch 24, the power supply 26, and the voltage regulating circuit 28 may be disposed at any suitable physical location within the receptacle 10. In some example embodiments of the disclosed concept, the thermistor R6 of the temperature sensing circuit 14 is disposed proximate to any point where current flows through the receptacle 10. The thermistor R6 may be disposed in direct contact with a point on the conductor carrying current or thermally coupled to and within a short distance of a conductor carrying current such that current flowing through the conductor is a primary cause of temperature change of the thermistor R6.

In some example embodiments of the disclosed concept, the thermistor R6 is disposed proximate one or more points on the neutral and/or line busses 200,202. For example and without limitation, the thermistor R6 may be disposed proximate to one or more of the sensor locations 203,204, 205,206 on the neutral and line busses 200,202 shown in FIG. 5B. However, it will be appreciated by those having ordinary skill in the art that the thermistor R6 may be disposed at other locations within the receptacle 10" without departing from the scope of the disclosed concept.

Figure 6:
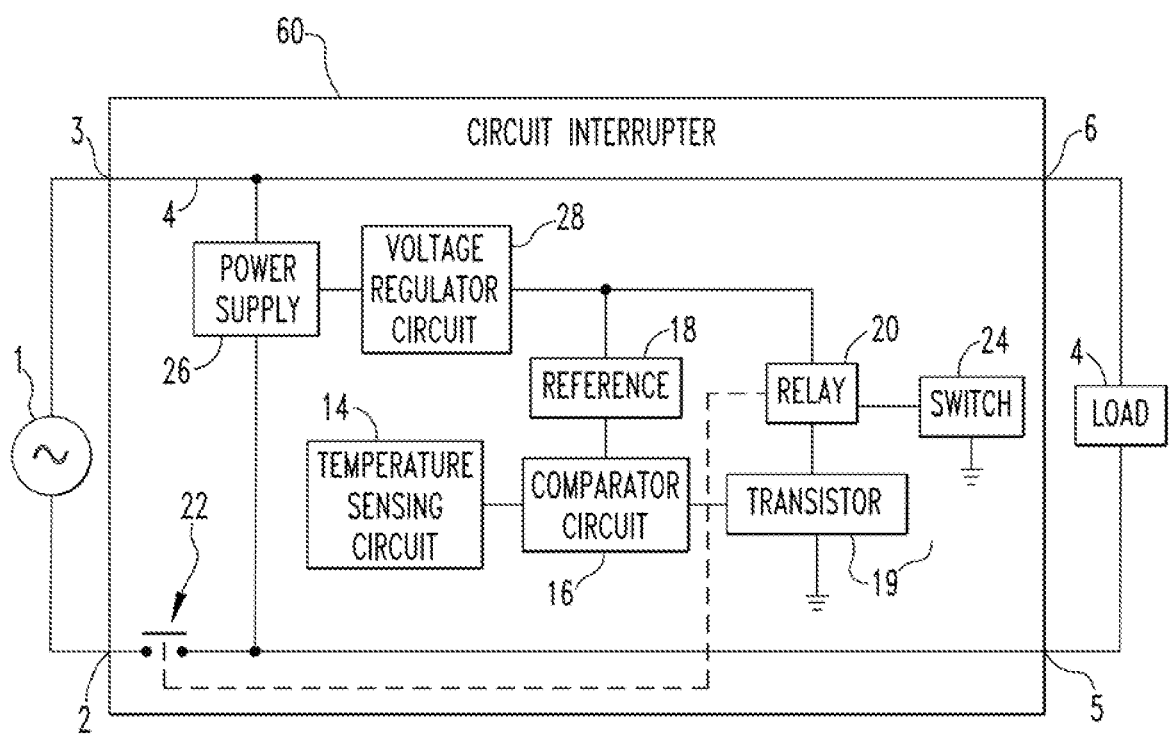
FIG. 6 is a schematic diagram of a circuit interrupter in accordance with an example embodiment of the disclosed concept.

The disclosed concept may also be employed in a circuit interrupter such as a circuit breaker. FIG. 6 is a schematic diagram of a circuit interrupter 60 in accordance with an example embodiment of the disclosed concept. The circuit interrupter 60 includes the temperature sensing circuit 14, comparator circuit 16, reference voltage generating circuit 18, transistor 19, relay 20, separable contacts 22, switch 24, power supply 26, and voltage regulating circuit 28 similar to the receptacle 10 of FIG. 1. For economy of disclosure, repeated description of these components is omitted.

The circuit interrupter 60 of FIG. 6 differs from the receptacle 10 of FIG. 1 in that the circuit interrupter 60 does not include an outlet. Rather, power from the power source 1 passes through the circuit interrupter 60 to a load 4 via line and neutral output terminals 5,6. Opening the separable contacts 22 causes power to stop flowing from the power source 1 to the load 4. It will be appreciated by those having ordinary skill in the art that the circuit interrupter 60 may be a circuit breaker. It will also be appreciated by those having ordinary skill in the art that the disclosed concept may also be applied in additional suitable applications.

FIG. 7 is a front view of the circuit interrupter 60 of FIG. 6. FIG. 7 illustrates a conductive path 100 through the circuit interrupter 60. The conductive path 100 represents the path through which line current travels through the circuit interrupter 60.

The comparator circuit 16, the reference voltage generating circuit 18, the transistor 19, the relay 20, the switch 24, the power supply 26, and the voltage regulating circuit 28 may be disposed at any suitable physical location within the circuit interrupter 60. In some example embodiments of the disclosed concept, the thermistor R6 of the temperature sensing circuit 14 is disposed proximate to the conductive path 100 of the circuit interrupter 60. The thermistor R6 may be disposed in direct contact with a point on the conductive path 100 or within a short distance of a point on the conductive path 100 such that current flowing through the conductive path 100 is a primary cause of temperature change of the thermistor R6.

An input terminal 102, and output terminal 104, and a resistive shunt 106 are illustrated along the conductive path 100 of the circuit interrupter 60. In some example embodiments of the disclosed concept, the thermistor R6 is disposed proximate one of the input terminal 102, the output terminal 104, and the resistive shunt 106. However, it will be appreciated by those having ordinary skill in the art that the thermistor R6 may be disposed proximate other locations along the conductive path 100 without departing from the scope of the disclosed concept.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A receptacle comprising:
   an outlet;
   an interruption mechanism structured to activate to de-energize the outlet;
   a temperature sensing circuit including a resistor and a thermistor arranged as a voltage divider, wherein the thermistor has a resistance proportional to temperature;
   a comparator circuit structured to compare an output of the temperature sensing circuit to a predetermined reference voltage and to selectively output a signal based on the comparison of the output of the temperature sensing circuit and the predetermined reference voltage,
   wherein the interruption mechanism is structured to activate to de-energize the outlet in response to the comparator circuit outputting the signal,
   wherein the interrupter mechanism includes a relay and separable contacts; wherein the relay is structured to activate and open the separable contacts in response to the comparator circuit outputting the signal; and
   wherein opening the separable contacts de-energizes the outlet.

2. The receptacle of claim 1, wherein the thermistor is a negative coefficient thermistor having a resistance that is inversely proportional to temperature; and wherein the comparator circuit is structured to output the signal when the output of the temperature sensing circuit is less than the predetermined reference voltage.

3. The receptacle of claim 1, wherein the thermistor is a positive coefficient thermistor having a resistance that is directly proportional to temperature; and wherein the comparator circuit is structured to output the signal when the output of the temperature sensing circuit is greater than the predetermined reference voltage.

4. The receptacle of claim 1, wherein the relay is a latching relay; wherein the separable contacts are normally closed; and wherein when the relay opens the separable contacts, the separable contacts latch open and remain open.

5. The receptacle of claim 1, further comprising:
   a transistor electrically connected between the comparator circuit and the relay,
   wherein the transistor is structured to turn on in response to the comparator circuit outputting the signal, and
   wherein the relay is structured to activate in response to the transistor turning on.

6. The receptacle of claim 1, further comprising:
   a switch,
   wherein actuation of the switch causes the relay to re-close the separable contacts.

7. The receptacle of claim 6, wherein the relay is a dual-coil relay.

8. The receptacle of claim 1, wherein the comparator circuit includes an operation amplifier having a first input and a second input; wherein the first input is structured to receive the output of the temperature sensing circuit; and wherein the second input is structured to receive the predetermined reference voltage.

9. A receptacle comprising:
   an outlet;
   an interruption mechanism structured to activate to de-energize the outlet;
   a temperature sensing circuit including a resistor and a thermistor arranged as a voltage divider, wherein the thermistor has a resistance proportional to temperature;
   a comparator circuit structured to compare an output of the temperature sensing circuit to a predetermined reference voltage and to selectively output a signal based on the comparison of the output of the temperature sensing circuit and the predetermined reference voltage, a processor electrically connected to the comparator circuit and being structured to sense the comparator circuit outputting the signal, wherein the interruption mechanism is structured to activate to de-energize the outlet in response to the comparator circuit outputting the signal, and wherein the processor is structured to cause the interruption mechanism to activate and de-energize the outlet in response to sensing the comparator circuit outputting the signal.

10. The receptacle of claim 1, further comprising:
a power supply structured to convert AC power from a power source to DC power.

11. The receptacle of claim 10, wherein the power supply includes a bridge rectifier.

12. The receptacle of claim 10, further comprising:
a voltage regulating circuit electrically connected to the power supply and being structured to regulate the DC power output by the power supply and output a supply voltage for use by the receptacle.

13. The receptacle of claim 1, further comprising:
a reference voltage generating circuit including a first resistor and a second resistor arranged as a voltage divider, wherein the reference voltage generating circuit is structured to output the predetermined reference voltage.

14. A circuit protection system comprising:
a receptacle including:
an outlet;
a temperature sensing circuit including a resistor and a thermistor arranged as a voltage divider, wherein the thermistor has a resistance proportional to temperature;
a comparator circuit structured to compare an output of the temperature sensing circuit to a predetermined reference voltage and to selectively output a signal based on the comparison of the output of the temperature sensing circuit and the predetermined reference voltage;
a processor electrically connected to the comparator circuit and being structured to sense the comparator circuit outputting the signal and to output a trip signal in response in response to sensing the comparator circuit outputting the signal; and a circuit breaker electrically connected between the receptacle and a power source, the circuit breaker including:
separable contacts structured to trip open to prevent power from flowing from the power source to the receptacle; and
a trip mechanism structured to receive the trip signal and to cause the separable contacts to trip open in response to the receiving the trip signal.

15. The circuit protection system of claim 14, wherein the thermistor is a negative coefficient thermistor having a resistance that is inversely proportional to temperature; and wherein the comparator circuit is structured to output the signal when the output of the temperature sensing circuit is less than the predetermined reference voltage.

16. The circuit protection system of claim 14, wherein the thermistor is a positive coefficient thermistor having a resistance that is directly proportional to temperature; and wherein the comparator circuit is structured to output the signal when the output of the temperature sensing circuit is greater than the predetermined reference voltage.

17. A circuit interrupter structured to be electrically connected between a power source and a load, the circuit interrupter comprising:
an interruption mechanism structured to activate to prevent power from flowing from the power source to the load;
a temperature sensing circuit including a resistor and a thermistor arranged as a voltage divider, wherein the thermistor has a resistance proportional to temperature;
a comparator circuit structured to compare an output of the temperature sensing circuit to a predetermined reference voltage and to selectively output a signal based on the comparison of the output of the temperature sensing circuit and the predetermined reference voltage,
wherein the interruption mechanism is structured to activate to prevent power from flowing from the power source to the load in response to the comparator circuit outputting the signal,
wherein the thermistor is a positive coefficient thermistor having a resistance that is directly proportional to temperature, and wherein the comparator circuit is structured to output the signal when the output of the temperature sensing circuit is greater than the predetermined reference voltage.

* * * * *